(12) United States Patent
Wang et al.

(10) Patent No.: US 11,551,076 B2
(45) Date of Patent: Jan. 10, 2023

(54) EVENT-DRIVEN TEMPORAL CONVOLUTION FOR ASYNCHRONOUS PULSE-MODULATED SAMPLED SIGNALS

(71) Applicant: QUALCOMM Incorporated, San Diego, CA (US)

(72) Inventors: Xin Wang, San Diego, CA (US); Young Cheul Yoon, San Diego, CA (US); Manu Rastogi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 940 days.

(21) Appl. No.: 14/835,664

(22) Filed: Aug. 25, 2015

(65) Prior Publication Data

US 2016/0071005 A1 Mar. 10, 2016

Related U.S. Application Data

(60) Provisional application No. 62/046,757, filed on Sep. 5, 2014.

(51) Int. Cl.
*G06N 3/08* (2006.01)
*G06N 3/04* (2006.01)
*G06F 17/15* (2006.01)

(52) U.S. Cl.
CPC .............. *G06N 3/08* (2013.01); *G06F 17/15* (2013.01); *G06N 3/04* (2013.01); *G06N 3/049* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 8,229,209 B2 | 7/2012 | Paquier | |
| 8,543,525 B2 | 9/2013 | Distante et al. | |
| 9,008,840 B1 | 4/2015 | Ponulak et al. | |
| 2008/0084343 A1* | 4/2008 | Heyl | H03H 17/0292 341/144 |
| 2012/0155140 A1* | 6/2012 | Chen | H02M 7/5387 363/132 |
| 2013/0137945 A1* | 5/2013 | Addison | A61B 5/02416 600/323 |
| 2014/0241211 A1 | 8/2014 | Zhang et al. | |
| 2015/0363904 A1* | 12/2015 | Arai | G06T 7/0012 382/131 |

FOREIGN PATENT DOCUMENTS

TW 201128463 A 8/2011

OTHER PUBLICATIONS

Ji, Shuiwang, et al. "3D convolutional neural networks for human action recognition." IEEE transactions on pattern analysis and machine intelligence 35.1 (2013): 221-231. (Year: 2013).*

(Continued)

*Primary Examiner* — Kevin W Figueroa
(74) *Attorney, Agent, or Firm* — Seyfarth Shaw LLP

(57) ABSTRACT

A method of processing asynchronous event-driven input samples of a continuous time signal, includes calculating a convolutional output directly from the event-driven input samples. The convolutional output is based on an asynchronous pulse modulated (APM) encoding pulse. The method further includes interpolating output between events.

20 Claims, 9 Drawing Sheets

(56) References Cited

OTHER PUBLICATIONS

Lawrence, Steve, et al. "Face recognition: A convolutional neural-network approach." IEEE transactions on neural networks 8.1 (1997): 98-113. (Year: 1997).*
Wang, Bingchang, Xiangyu Meng, and Tongwen Chen. "Event based pulse-modulated control of linear stochastic systems." IEEE Transactions on Automatic Control 59.8 (2014): 2144-2150. (Year: 2014).*
Valley, George C. "Photonic analog-to-digital converters." Optics express 15.5 (2007): 1955-1982. (Year: 2007).*
Ambardar, Ashok. Analog and digital signal processing. Boston, MA: PWS, 1995. (Year: 1995).*
Åström, Karl Johan, and Bo Bernhardsson. "Comparison of periodic and event based sampling for first-order stochastic systems." IFAC Proceedings vols. 32.2 (1999): 5006-5011. (Year: 1999).*
Kofman, Ernesto, and Julio H. Braslavsky. "Level crossing sampling in feedback stabilization under data-rate constraints." Proceedings of the 45th IEEE Conference on Decision and Control. IEEE, 2006. (Year: 2006).*
Ji, Shuiwang, et al. "3D convolutional neural networks for human action recognition." IEEE transactions on pattern analysis and machine intelligence 35.1 (2012): 221-231. (Year: 2012).*
Sahoo A., et al., "Event-Triggered Optimal Control of Nonlinear Continuous-time Systems in Affine Form by using Neural Networks," 53rd IEEE Conference on Decision and Control, 2014, pp. 1227-1232.
International Search Report and Written Opinion—PCT/US2015/047010—ISA/EPO—dated Feb. 12, 2016.
Perez-Carrasco J.A., et al., "Mapping from Frame-driven to Frame-free event-driven Vision Systems by Low-rate Rate Coding and Coincidence Processing: Application to Feedforward ConvNets," IEEE Transactions on Pattern Analysis and Machine Intelligence, Apr. 10, 2013 (Apr. 10, 2013), vol. 35, No. 11, pp. 2706-2719, XP055247113, DOI: 10.1109/TPAMI.2013.71.
Zhao B., et al., "Bio-inspired Categorization using Event-driven Feature Extraction and Spike-based Learning," Proceedings of the 2014 International Joint Conference on Neural Networks (IJCNN'14), Jul. 6, 2014 (Jul. 6, 2014), pp. 3845-3852, XP055247146, DOI: 10.1109/IJCNN.2014.6889541.
Taiwan Search Report—TW104128169—TIPO—dated Sep. 18, 2019.

* cited by examiner

EVENT-DRIVEN TEMPORAL CONVOLUTION FOR ASYNCHRONOUS PULSE-MODULATED SAMPLED SIGNALS

CROSS-REFERENCE TO RELATED APPLICATION

The present application claims the benefit of U.S. Provisional Patent Application No. 62/046,757, filed on Sep. 5, 2014, and titled "EVENT-DRIVEN TEMPORAL CONVOLUTION FOR ASYNCHRONOUS PULSE-MODULATED SAMPLED SIGNALS," the disclosure of which is expressly incorporated by reference herein in its entirety.

BACKGROUND

1. Field

Certain aspects of the present disclosure generally relate to machine learning and, more particularly, to improving systems and methods of event-driven temporal convolution for asynchronous pulse-modulated sampled signals in neural networks.

2. Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, a method of processing asynchronous event-driven input samples of a continuous time signal is presented. The method includes calculating a convolutional output directly from the event-driven input samples. The convolutional output is based on an asynchronous pulse modulated (APM) encoding pulse.

In another aspect of the present disclosure, an apparatus for processing asynchronous event-driven input samples of a continuous time signal is presented. The apparatus includes a memory and at least one processor coupled to the memory. The one or more processors are configured to calculate a convolutional output directly from the event-driven input samples.

In yet another aspect of the present disclosure, an apparatus for processing asynchronous event-driven input samples of a continuous time signal is presented. The apparatus includes means for calculating a convolutional output directly from the event-driven input samples. The apparatus further includes means for interpolating output between events.

In still another aspect of the present disclosure, a non-transitory computer readable medium is presented. The non-transitory computer readable medium has program code thereon, which when executed by a processor causes the processor to process asynchronous event-driven input samples of a continuous time signal. The program code includes program code to calculate a convolutional output directly from the event-driven input samples.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
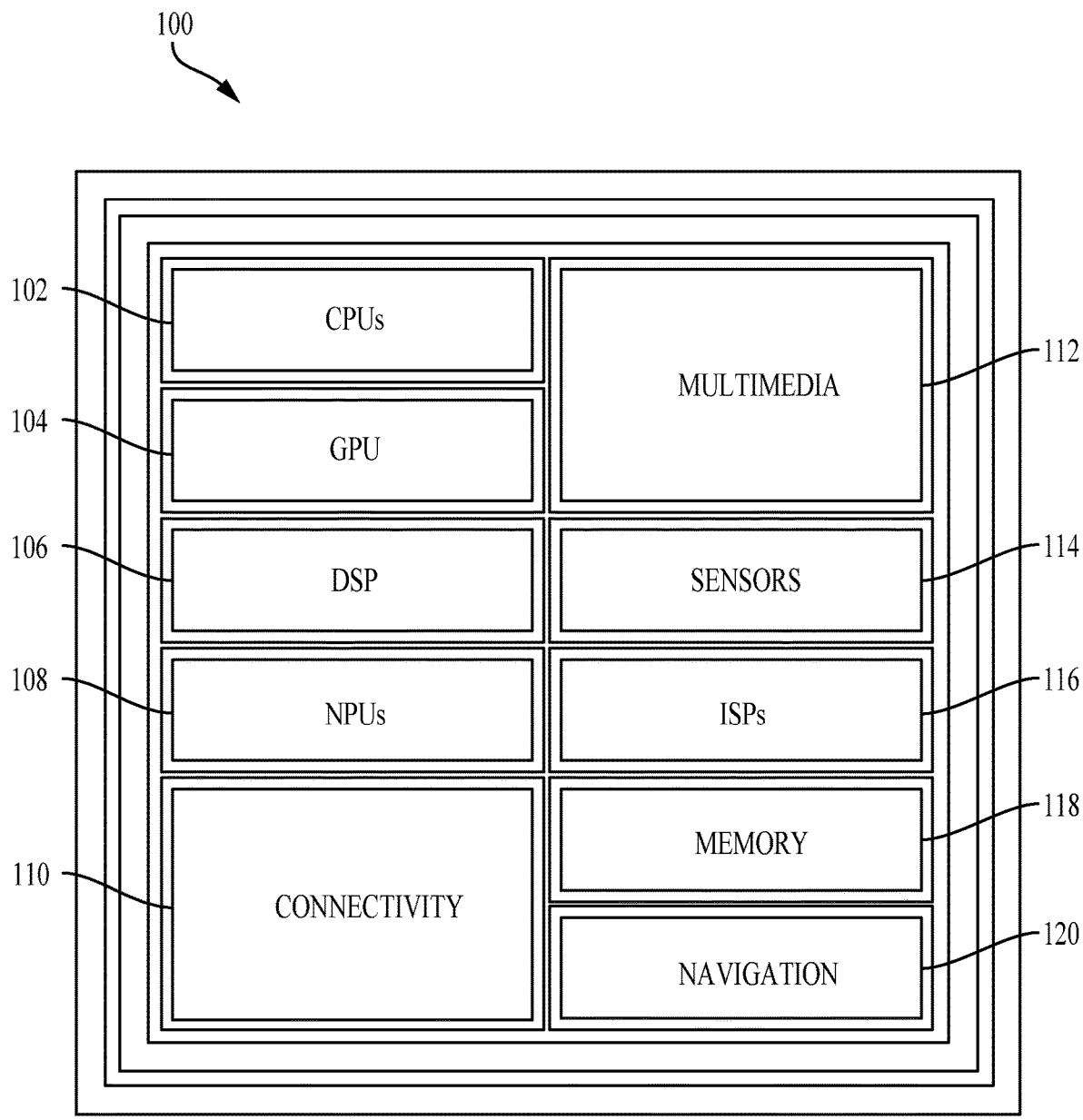
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Event-Driven Temporal Convolution for Asynchronous Pulse-Modulated Sampled Signals Uniform sampling is used in conventional data acquisition and signal processing techniques. The sampling frequency may be determined according to a maximum expected spectral frequency. This maximum-frequency sampling, however, may waste power for input signals with relaxed properties (e.g., reduced frequency content, increased periods of silence). The use of maximum-frequency sampling is problematic for emerging applications that rely on scarce energy resources.

Event-based sampling is a promising alternative to uniform sampling. In event-based sampling, a sample is only output when something significant (e.g., an event) occurs in the signal. One aspect of the present disclosure involves an event-driven signal processing technique for powering future, energy-efficient neuromorphic systems that rely on scarce energy resources.

An aspect of the present disclosure is directed to event-driven processing for temporal convolution of sampled signals (e.g., Lebesgue and/or asynchronous pulse modulated (APM) sampled signals). In particular, one aspect relates to event-driven processing for temporal convolution of APM sampled signals in which the encoding pulse and kernel (e.g., impulse response) functions are both expressed as complex sums of causal complex exponentials. Accordingly, the convolution of sampled signals provided according to asynchronous event-driven signal processing techniques may power future neuromorphic systems that are highly energy-efficient.

In accordance with aspects of the present disclosure, a continuous analog signal may be received as an input. An event-based sampling process may be applied to generate a train of pulses. In some aspects, the sampling process may comprise an APM sampling process or the like. The train of pulses may be positive pulses, negative pulses or both (bipolar). Because the input is sampled on the occurrence of an event, the sampling rate is much lower than may be observed for uniform time sampling, for example. As such, the present systems and methods make satisfying the Nyquist sampling rate to recreate an input signal more readily achievable.

The train of pulses may in turn be processed by directly applying a convolution of the pulse train with a kernel function to approximate the time domain output (e.g., continuous signal). That is, the train of pulses may be used to generate the output signal without converting the pulses back to analog to process and create the output signal. In some aspects, the output signal, which may have an event-based form, may be maintained in such form for further processing. Additional post-processing, such as passing the output to a second stage filter, may be conducted directly without the expense of re-conversion from an analog signal.

Asynchronous Event-Based Sampling

Consider an integrable continuous-time real signal x(t): $[t_o, \infty) \to \mathbb{R}$ from time $t_0$, where X is the set that contains all such signals x(t).

A polarized event train $\Sigma(t): [t_o, \infty) \to \mathbb{R}$ is a response function of an ordered set of polarized events $\{(t_k, p_k) | t_k \in [t_0, \infty), p_k \in_E \{-1, 1\}\}(k=1, \ldots, K)$, such that:

$$t_k < t'_k \text{ if } k < k', \text{ and} \tag{1}$$

$$\xi(t; \{(t_k, p_k)\}) = \sum_k p_k \delta(t - t_k), \tag{2}$$

where δ is the Dirac delta function. By ≡ we denote the set containing all such event trains $\Sigma(t)$. The direct reconstruction of a polarized event train $\Sigma(t; \{(t_k, \mathcal{P}k)\})$ under kernel function h(t) may be given by its convolution with h(t).

$$y(t) = [\xi * h](t) \quad (3)$$

$$= \int h(T)\xi(t-\tau)d\tau \quad (4)$$

$$= \sum_k p_k h(t-t_k). \quad (5)$$

In some aspects, the kernel function may be causal (e.g., $h(t)=0, \forall t \leq 0$). We further denote by $\rho h := \to X$ the direct reconstructor (e.g., $y(t)= \varrho\, h[\Sigma](t)$).

An asynchronous pulse modulation (APM) sampler $\varsigma_h: X \to \equiv$ may transform $x(t)$ to a polarized event train $\Sigma(t; \{(t_k, p_k)\})=\varsigma_h[x](t)$ under kernel function (e.g., pulse) $h(t)$ such that $\forall k \in \{1, \ldots, N\}$:

$$|x(t_k)-y(t_k)-x(t_o)|=\frac{1}{2}, \quad (6)$$

$$\text{sign}(x(t_k-0)-y(t_k-0)-x(t_o))=p_k \text{ and} \quad (7)$$

$$|x(t)-y(t)-x(t_o)|<\frac{1}{2}, \forall t \in \{t_k\}, \quad (8)$$

where 0 is an infinitesimally small positive number and $y(t)=[x*h](t)$ is the direct reconstruction of $\Sigma(t)$ under $h(t)$.

A level-crossing sampler (e.g., Lebesgue sampler) $\varsigma_\Theta: X \to \equiv$ is an APM sampler with a heavy-side step function $\Theta(t)$ as its kernel function. The heavy-side step function may be defined as:

$$\Theta(t)=\int_{-\infty}^{t}\delta(t)dt. \quad (9)$$

Event-Driven Signal Processing

Given continuous signals $x(t)$, the goal of processing can be, in general, defined as the computation of a transform of the continuous time signals $x(t)$. For example, in some aspects, the transform may be given by:

$$y(t,s)=\mathcal{T}[x](t,s), \quad (10)$$

where s represents optional extra independent variables.

In practice, $x(t)$ may be first sampled by a sampler $\mathcal{L}$:

$$\Sigma(t;\{(t_k,q_k)\})=\mathcal{L}[x](t), \quad (11)$$

which may result in a time-ordered set of time-value pairs $\{(t_k, q_k)\}$. In some aspects, $t_k$s may be chosen such that they have regular, equal intervals, so as to configure the sampler as a Riemann sampler. In another configuration, the $q_k$s may be binary so as to configure the sampler as an APM sampler. Furthermore, the sampler may be configured as a level crossing sampler (e.g., a Lebesgue sampler).

Then, a technique $\mathcal{A}$ is applied to the sampled signal $\Sigma(t)$:

$$\hat{y}(t,s)=\mathcal{A}[\Sigma](t,s), \quad (12)$$

to compute an approximated target transform $\hat{y}(t, s) \approx y(t, s)$ defined at times $\{t_k\}$. Thus, in general, a signal processing paradigm may be completely determined by a target transform, a sampler, and a technique ($\mathcal{T}, \mathcal{L}, \mathcal{A}$), that operates on sampled signals. As a special case, if $\mathcal{T}$ is the identity transform (e.g., $\mathcal{T}=I$) where I is the identity function, the signal processing paradigm reduces to a communication paradigm:

$$y(t,s)=I[x](t)=x(t), \quad (13)$$

of which the goal is to reconstruct signal $x(t)$ from its sampled version $\Sigma(t)$.

In some aspects, an event-driven technique may be used to transform $\Sigma(t; \{[(t_k, q_k)\})$ to $\hat{y}(t, s)$. If $\mathcal{A}$ can be expressed in the following recurrence relation:

$$\hat{y}(t_k,s)=f_\mathcal{A}((t_k,q_k);(t_{k-1},q_{k-1},\hat{y}(t_{k-1},s)), \ldots, (t_{k-n},q_{k-n},\hat{y}(t_{k-n},s))) \quad (14)$$

$$=f_\mathcal{A}(t_k,t_{k-1}, \ldots, t_{k-n};q_k,q_{k-1}, \ldots, q_{k-n};\hat{y}(t_{k-1},s), \ldots, \hat{y}(t_{k-n},s)), \quad (15)$$

where n is a finite non-negative integer, the technique may be considered event-driven. That is, the output value $\hat{y}$ upon arrival of the sample, or synonymously event, $(t_k, q_k)$, may be computed from the current sample, in addition to a finite history.

For example, if $f_\mathcal{A}$ can be further expressed as sample time intervals rather than absolute time, $$\hat{y}(t_k,s)=f_\mathcal{A}(t_k-t_{k-1}, \ldots, t_k-t_{k-n};q_k,q_{k-1}, \ldots, q_{k-n};\hat{y}(t_{k-1},s), \ldots, \hat{y}(t_{k-n},s)), \quad (16)$$

the event-driven technique may also be called time invariant.

Further, in some aspects, $f_\mathcal{A}$ may be expressed in the following generalized linear form:

$$\hat{y}(t_k, s) = \sum_{j=0}^{n} A(t_{k-j}, t_k, s)\varphi(t_{k-j}, q_{k-j}, s) + \sum_{j=1}^{n} B(t_{k-j}, t_k, s)\hat{y}(t_{k-j}, s), \quad (17)$$

where $\varphi$ is a vector function of sample value qs, and A and B are, respectively, the feed-forward and feedback kernel functions. The event-driven technique may be characterized as a generalized linear. Furthermore, in some aspects, a time invariant event-driven signal processing technique $f_\mathcal{A}$ may be expressed in the following generalized linear form:

$$\hat{y}(t_k, s) = \sum_{j=0}^{n} A(t_{k-j} - t_k, s)\varphi(t_{k-j}, q_{k-j}, s) + \sum_{j=1}^{n} B(t_{k-j} - t_k, s)\hat{y}(t_{k-j}, s), \quad (18)$$

As such, the event-driven signal processing technique $\mathcal{A}$ may be considered linear time invariant (LTI).

In one example, where Riemann sampling of a single signal (e.g., $t_k$s) are spaced by regular intervals, $q_k=[x(t_k)]$ and $\varphi$ being the identity function of $q_k$, a time invariant generalized linear event-driven signal processing technique may comprise an infinite impulse-response (IIR) filter.

Event-Driven Convolution

Convolution of signal $x(t)$ with kernel function $k(t)$ may be defined as $$\tilde{x}(t) = [k * x](t) \quad (19)$$

$$= \int k(\tau)x(t-\tau)d\tau \quad (20)$$

$$= \int x(\tau)k(t-\tau)d\tau. \quad (21)$$

Convolution with the Direct Reconstruction of an APM Sampled Signal

When $x(t)$ is first sampled (e.g., APM sampled) by $\varsigma_h$, e.g., $\Sigma(t)=\varsigma_h[x](t)$, and then directly reconstructed by $\varrho_h$, e.g., $y(t)=\varrho_h[\Sigma](t)=(\varrho_h \circ \varsigma_h)[x](t)$, the convolution of $y(t)$ with $k(t)$ may provide an approximation of $\tilde{x}(t)$:

$$\tilde{y}(t) = [k * y](t) \quad (22)$$

$$= \int k(\tau) y(t-\tau) d\tau \quad (23)$$

$$= \int y(\tau) k(t-\tau) d\tau. \quad (24)$$

Using $\{(t_k, p_k)\}$ to denote the event train and applying Eqn. 5:

$$\tilde{y}(t) = \int \sum_k p_k h(\tau - t_k) k(t-\tau) d\tau \quad (25)$$

$$= \sum_k p_k \int h(\tau - t_k) k(t-\tau) dt \quad (26)$$

$$= \sum_k p_k \tilde{y}_k(t), \quad (27)$$

where $$\tilde{y}_k(t) \triangleq \int h(\tau - t_k) k(t-\tau) dt \quad (28)$$

is the elementary contribution to $\tilde{y}(t)$ by event $t_k$.

Complex Weighted Complex Exponential Expansion of Encoding Pulses and Kernel Functions To derive purely event-driven techniques for convolution, the APM encoding pulse and the convolution kernel function may be expressed as a complex weighted sum of causal complex exponentials.

Given an arbitrary causal function, $f(t) = \Theta(t) g(t)$, if $g(t)$ can be expressed as an complex exponential sum, e.g., $$g(t) = \sum_j a_j e^{b_j t}, \quad (29)$$

where $a_j, b_j \in \mathbb{C}$, then $f(t)$ can be expressed as a complex weighted sum of causal complex exponentials:

$$f(t) = \Theta(t) \sum_j a_j e^{b_j t} \quad (30)$$

$$= \sum_j a_j [\Theta(t) e^{b_j t}] \quad (31)$$

$$\triangleq \sum_j a_j f_j(t; b_j). \quad (32)$$

Further, a real function expressed as a weighted sum of causal, damped oscillations may be converted to the form of complex weighted sum of causal complex exponentials. First, the real function as weighted sum of N causal, damped oscillations may be expressed as:

$$f(t) = \sum_{n=1}^{N} \Theta(t) \rho_n e^{-\sigma_n t} \cos(\omega_n t + \phi_n), \quad (33)$$

where $\rho_n$'s, $\sigma_n$'s, $\omega_n$'s and $\phi_n$'s are the amplitudes, damping constants, angular frequencies and phases of the components.

Constructing $(a_j, b_j)(j=1, \ldots, 2N)$ by conjugate pairs of complex exponentials $$a_j = \frac{1}{2} \rho_{\lceil \frac{j}{2} \rceil} e^{-i(-1)^j \phi_{\lceil \frac{j}{2} \rceil}} \text{ and} \quad (34)$$

$$b_j = -\sigma_{\lceil \frac{j}{2} \rceil} - i(-1)^j \omega_{\lceil \frac{j}{2} \rceil}, \quad (35)$$

produces $$\Theta(t) \sum_{j}^{2N} a_j e^{b_j t} = \sum_{n}^{N} \Theta(t) \rho_n e^{-\sigma_n t} \cos(\omega_n t + \phi_n) = f(t). \quad (36)$$

This means that a real causal function in the form of Eqn. 33 can be expressed as a complex weighted sum of causal complex exponentials. In some aspects, the APM encoding pulse h(t) and the convolution kernel function k(t) can both be expressed in this form for example as follows:

$$h(t; a_h^{(1)}, \ldots, a_h^{(N)}, b_h^{(1)}, \ldots, b_h^{(N)}) = \quad (37)$$
$$\sum_{n=1}^{N} a_h^{(n)} h^{(n)}(t; b_h^{(n)}) = \sum_{n=1}^{N} a_h^{(n)} \Theta(t) e^{b_h^{(n)} t}$$

$$k(t; a_k^{(1)}, \ldots, a_k^{(M)}, b_k^{(1)}, \ldots, b_k^{(M)}) = \quad (38)$$
$$\sum_{m=1}^{M} a_k^{(m)} k^{(m)}(t; b_k^{(m)}) = \sum_{m=1}^{M} a_k^{(m)} \Theta(t) e^{b_k^{(m)} t}.$$

Plugging these functions into Eqn. 28, the contribution from event $t_k$ is then $$\tilde{y}_k(t) = \int \sum_n a_h^{(n)} \Theta(\tau - t_k) e^{b_h^{(n)}(\tau - t_k)} \sum_m a_k^{(m)} \Theta(t-\tau) e^{b_k^{(m)}(t-\tau)} d\tau \quad (39)$$

$$= \sum_n \sum_m a_h^{(n)} a_k^{(m)} \int \Theta(\tau - t_k) \Theta(t-\tau) e^{b_h^{(n)}(\tau - t_k) + b_k^{(m)}(t-\tau)} d\tau \quad (40)$$

$$= \sum_n \sum_m \tilde{y}_k^{(n,m)}(t), \quad (41)$$

where $$\tilde{y}_k^{(n,m)}(t) \triangleq a_h^{(n)} a_k^{(m)} \int \Theta(\tau - t_k) \Theta(t-\tau) e^{b_h^{(n)}(\tau - t_k) + b_k^{(m)}(t-\tau)} d\tau \quad (42)$$

is an elementary contribution to $\tilde{y}(t)$ from event $t_k$ by the n-th component of the APM pulse and the m-th component of the kernel function.

Causal Complex Exponential Encoding Pulse and Kernel Function

Considering an elementary contribution from event $t_k$ by a causal complex exponential encoding pulse and a kernel function of the same form, e.g., $$\tilde{y}_k(t) = a_h a_k \int \Theta(\tau - t_k) \Theta(t-\tau) e^{b_h(\tau - t_k) + b_k(t-\tau)} d\tau \quad (43)$$

$$= a_h a_k e^{b_k t - b_h t_k} \int \Theta(\tau - t_k) \Theta(t-\tau) e^{(b_h - b_k)\tau} d\tau \quad (44)$$

$$= a_h a_k \Theta(t - t_k) e^{b_k t - b_h t_k} \int_{t_k}^{t} e^{(b_h - b_k)\tau} d\tau \quad (45)$$

$$= \Theta(t-t_k)\frac{a_h a_k e^{b_k t - b_h t_k}}{b_h - b_k}[e^{(b_h - b_k)\tau} - e^{(b_h - b_k)t_k}] \quad (46)$$

$$= \Theta(t-t_k)\frac{a_h a_k}{b_h - b_k}[e^{b_h(t-t_k)} - e^{b_k(t-t_k)}]. \quad (47)$$

As such, $\tilde{y}_k(t)$ may be decomposed into two components, e.g., $$\tilde{y}_k(t) = \tilde{u}_k(t) + \tilde{v}_k(t), \quad (48)$$

where $$\tilde{u}_k(t) = \Theta(t-t_k)\frac{a_h a_k}{b_h - b_k}e^{b_h(t-t_k)} \text{ and} \quad (49)$$

$$\tilde{v}_k(t) = \Theta(t-t_k)\frac{a_h a_k}{b_h - b_k}e^{b_k(t-t_k)}. \quad (50)$$

Further defining $$\tilde{u}(t) = \sum_k p_k \tilde{u}_k(t) \text{ and} \quad (51)$$

$$\tilde{v}(t) = \sum_k p_k \tilde{v}_k(t), \quad (52)$$

we have $$\tilde{y}(t) = \tilde{u}(t) + \tilde{v}(t) \quad (53)$$

An Event-Driven Technique for Convolution with a Causal Exponential Kernel of an APM Sampled Signal Under Causal Exponential Pulse First, considering the evolution of $\tilde{y}(t)$ from event $t_{k-1}$ to event $t_k$, at $t=t_{k-1}+0$ (here 0 may represent an infinitesimal positive value), $$\tilde{u}(t_{k-1} + 0) = \sum_{l=1}^{k-1} p_l \tilde{u}_l(t_{k-1}) \quad (54)$$

$$= \sum_{l=1}^{k-1} p_l \Theta(t_{k-1} - t_l)\frac{a_h a_k}{b_h - b_k}e^{b_h(t_{k-1} - t_l)} \quad (55)$$

$$= \frac{a_h a_k}{b_h - b_k}\sum_{l=1}^{k-1} p_l e^{b_h(t_{k-1} - t_l)}; \quad (56)$$

$$\tilde{v}(t_{k-1} + 0) = \sum_{l=1}^{k-1} p_l \tilde{v}_l(t_{k-1}) \quad (57)$$

$$= \sum_{l=1}^{k-1} p_l \Theta(t_{k-1} + 0 - t_l)\frac{a_h a_k}{b_h - b_k}e^{b_k(t_{k-1} - t_l)} \quad (58)$$

$$= -\frac{a_h a_k}{b_h - b_k}\sum_{l=1}^{k-1} p_l e^{b_k(t_{k-1} - t_l)}. \quad (59)$$

$$\tilde{u}(t_{k-1} - 0) = \sum_{l=1}^{k-1} p_l \tilde{u}_l(t_k) \quad (60)$$

$$= \sum_{l=1}^{k-1} p_l \Theta(t_{k-1} + 0 - t_l)\frac{a_h a_k}{b_h - b_k}e^{b_h(t_k - t_l)} \quad (61)$$

$$= \frac{a_h a_k}{b_h - b_k}\sum_{l=1}^{k-1} p_l e^{b_h(t_k - t_l)} \quad (62)$$

$$= e^{b_h(t_k - t_{k-1})}\left[\frac{a_h a_k}{b_h - b_k}\sum_{l=1}^{k-1} p_l e^{b_h(t_{k-1} - t_l)}\right] \quad (63)$$

$$= e^{b_h(t_k - t_{k-1})}\tilde{u}(t_{k-1} + 0); \quad (64)$$

$$\tilde{v}(t_k - 0) = \sum_{l=1}^{k-1} p_l \tilde{v}_l(t_k) \quad (65)$$

$$= \sum_{l=1}^{k-1} p_l \Theta(t_k - 0 - t_l)\frac{a_h a_k}{b_h - b_k}e^{b_k(t_k - t_l)} \quad (66)$$

$$= -\frac{a_h a_k}{b_h - b_k}\sum_{l=1}^{k-1} p_l e^{b_k(t_k - t_l)} \quad (67)$$

$$= e^{b_k(t_k - t_{k-1})}\left[\frac{a_h a_k}{b_h - b_k}\sum_{l=1}^{k-1} p_l e^{b_k(t_{k-1} - t_l)}\right] \quad (68)$$

$$= e^{b_k(t_k - t_{k-1})}\tilde{v}(t_{k-1} + 0). \quad (69)$$

Finally at $t=t_k+0$, $$\tilde{u}(t_{k-1} - 0) = \sum_{l=1}^{k} p_l \tilde{u}_l(t_k) \quad (70)$$

$$= p_k \tilde{u}_k(t_k) + \sum_{l=1}^{k-1} p_l \tilde{u}_l(t_k) \quad (71)$$

$$= \frac{p_k a_h a_k}{b_h - b_k} + \tilde{u}(t_k - 0); \quad (72)$$

$$\tilde{v}(t_k + 0) = \sum_{l=1}^{k} p_l \tilde{v}_l(t_k) \quad (73)$$

$$= p_k \tilde{v}_k(t_k) + \sum_{l=1}^{k-1} p_l \tilde{v}_l(t_k) \quad (74)$$

$$= -\frac{p_k a_h a_k}{b_h - b_k} + \tilde{v}(t_k - 0) \quad (75)$$

Thus, the changes in $\tilde{u}$ and $\tilde{v}$ from event $t_{k-1}$ to event $t_k$ are $$\tilde{u}(t_k + 0) = \frac{p_k a_h a_k}{b_h - b_k} + e^{b_h(t_k - t_{k-1})}\tilde{u}(t_{k-1} + 0); \quad (76)$$

$$\tilde{v}(t_k + 0) = \frac{p_k a_h a_k}{b_h - b_k} + e^{b_h(t_k - t_{k-1})}\tilde{v}(t_{k-1} + 0). \quad (77)$$

Adding Eqns. 76 and 77 together, produces $$\tilde{y}(t_k + 0) = \tilde{u}(t_k + 0) + \tilde{v}(t_k + 0) \quad (78)$$

$$= e^{b_h(t_k - t_{k-1})}\tilde{u}(t_{k-1} + 0) + e^{b_k(t_k - t_{k-1})}\tilde{v}(t_{k-1} + 0). \quad (79)$$

Combining Eqns. 76, 77 and 79, this particular recursive technique is a generalized linear time-invariant (LTI) infinite impulse response (IIR) filter (Eqn. 18), which may, for example, be given by:

$$\begin{bmatrix} \tilde{u}(t_k+0) \\ \tilde{v}(t_k+0) \\ \tilde{y}(t_k+0) \end{bmatrix} = A\varphi(p_k) + B(t_k - t_{k-1}) \begin{bmatrix} \tilde{u}(t_{k-1}+0) \\ \tilde{v}(t_{k-1}+0) \\ \tilde{y}(t_{k-1}+0) \end{bmatrix}, \quad (80)$$

where $$\varphi(p) = p, \quad (81)$$

$$A = \frac{a_h a_k}{b_h - b_k} \begin{bmatrix} 1 \\ -1 \\ 0 \end{bmatrix}, \text{ and} \quad (82)$$

$$B(\Delta t) = \begin{bmatrix} e^{b_h \Delta t} & 0 & 0 \\ 0 & e^{b_k \Delta t} & 0 \\ e^{b_h \Delta t} & e^{b_k \Delta t} & 0 \end{bmatrix}. \quad (83)$$

An Event-Driven Technique for Convolution of an APM Sampled Signal

Accordingly, the full convolution technique for generalized complex weighted complex exponential sum encoding pulses and kernel function may be derived.

Based on the recursive technique described in Eqns. 80, 81, 82 and 83, the elementary contribution to $\tilde{y}(t)$ from event $t_k$ by the n-th component of the APM pulse and the m-th component of the kernel function $\tilde{y}_k^{(n,m)}(t)$ can be computed in a purely event-driven way using the following equation:

$$\begin{bmatrix} \tilde{u}^{(n,m)}(t_k+0) \\ \tilde{v}^{(n,m)}(t_k+0) \\ \tilde{y}^{(n,m)}(t_k+0) \end{bmatrix} = \quad (84)$$

$$\frac{a_h a_k}{b_h - b_k} \begin{bmatrix} 1 \\ -1 \\ 0 \end{bmatrix} p_k + e^{t_k - t_{k-1}} \begin{bmatrix} e^{b_h} & 0 & 0 \\ 0 & e^{b_k} & 0 \\ e^{b_h} & e^{b_k} & 0 \end{bmatrix} \begin{bmatrix} \tilde{u}^{(n,m)}(t_{k-1}+0) \\ \tilde{v}^{(n,m)}(t_{k-1}+0) \\ \tilde{y}^{(n,m)}(t_{k-1}+0) \end{bmatrix},$$

where $$\tilde{u}^{(n,m)}(t) \triangleq \sum_k p_k \tilde{u}_k^{(n,m)}(t) \text{ and} \quad (85)$$

$$\tilde{v}^{(n,m)}(t) \triangleq \sum_k p_k \tilde{v}_k^{(n,m)}(t) \quad (86)$$

are two auxiliary state variables.

Considering $$\tilde{y}(t) = \sum_{n,m} \tilde{y}^{(n,m)}(t), \quad (87)$$

the full recursive equation may be expressed as the following:

$$\begin{bmatrix} \tilde{u}^{(1,1)}(t_k+0) \\ \vdots \\ \tilde{u}^{(N,M)}(t_k+0) \\ \tilde{v}^{(1,1)}(t_k+0) \\ \vdots \\ \tilde{v}^{(N,M)}(t_k+0) \\ \tilde{y}(t_k+0) \end{bmatrix} = \begin{bmatrix} \frac{a_h^{(1)} a_k^{(1)}}{b_h^{(1)} - b_k^{(1)}} \\ \vdots \\ \frac{a_h^{(N)} a_k^{(M)}}{b_h^{(N)} - b_k^{(M)}} \\ \frac{a_h^{(1)} a_k^{(1)}}{b_h^{(1)} - b_k^{(1)}} \\ \vdots \\ \frac{a_h^{(N)} a_k^{(M)}}{b_h^{(N)} - b_k^{(M)}} \\ 0 \end{bmatrix} p_k + \quad (88)$$

$$e^{t_k - t_{k-1}} \begin{bmatrix} e^{b_h^{(1)}} & \cdots & 0 & 0 & \cdots & 0 & 0 \\ \vdots & \ddots & \vdots & \vdots & \ddots & \vdots & \vdots \\ 0 & \cdots & e^{b_h^{(N)}} & 0 & \cdots & 0 & 0 \\ 0 & \cdots & 0 & e^{b_k^{(1)}} & \cdots & 0 & 0 \\ \vdots & \ddots & \vdots & \vdots & \ddots & \vdots & \vdots \\ 0 & \cdots & 0 & 0 & \cdots & e^{b_k^{(M)}} & 0 \\ e^{b_h^{(1)}} & \cdots & e^{b_h^{(N)}} & e^{b_k^{(1)}} & \cdots & e^{b_k^{(M)}} & 0 \end{bmatrix} \begin{bmatrix} \tilde{u}^{(1,1)}(t_{k-1}+0) \\ \vdots \\ \tilde{u}^{(N,M)}(t_{k-1}+0) \\ \tilde{v}^{(1,1)}(t_{k-1}+0) \\ \vdots \\ \tilde{v}^{(N,M)}(t_{k-1}+0) \\ \tilde{y}(t_{k-1}+0) \end{bmatrix}.$$

To summarize, the full purely event-driven technique for convolution of an APM sampled signal is described in Table 1. Table 1 includes exemplary pseudo code for computing the convolution of an APM sampled signal in which an APM kernel and convolution kernel functions are arbitrary causal functions expressed as complex weighted sums of complex exponentials.

TABLE 1

| Pseudo code | Comment |
| --- | --- |
| 1  $(t, t_{last}) \leftarrow (t_0, t_0)$ | Initialize current and last event times to t_0 |
| 2  $t \leftarrow [t_1, \ldots, t_K]$ | Event time vector; Vector t and the next p represent the input signal, which may be known in advance or appear as the input signal arrives and is sampled (e.g., with cross level sampling) |
| 4  $p \leftarrow [p_1, \ldots, p_K]$ | Event polarity vector |
| 5  $a_h \leftarrow [a_h^{(1)}, \ldots a_h^{(N)}]$ | Complex weights; First set of N constant coefficients and next (2nd set b_h) represent kernel function h(t) to represent (along with t and p vectors above) input signal. |

TABLE 1-continued

| Pseudo code | Comment |
| --- | --- |
| 6  $b_h \leftarrow [b_h^{(1)}, \ldots b_h^{(N)}]$ | Complex exponents |
| 7  $a_k \leftarrow [a_k^{(1)}, \ldots a_k^{(M)}]$ | Complex weights; First set of M constant coefficients and next (2nd set b_kappa) represent kernel function kappa(t) to represent the system impulse response (or second input signal) |
| 8  $b_k \leftarrow [b_k(1), \ldots b_k^{(M)}]$ | Complex exponents |
| 9  for n from 1 to N do | |
| 10    for m from 1 to M do | Double "for loop" initializes all MxN state variables to zero |
| 11      $(u^{(n,m)}, v^{(n,m)}) \leftarrow (0, 0)$ | Initialize state variables |
| 12    end for | |
| 13  end for | |
| 14  $y \leftarrow 0$ | Initialize output sample (e.g., a state variable) to 0 |
| 15  for k from 1 to K do | For each event |
| 16    $t \leftarrow t_k$ | Take kth time event sample and set t to $t_k$ |
| 17    for n from 1 to N do | Update MxN state variables |
| 18      for m from 1 to M do | |
| 19        $u^{(n,m)} \leftarrow \frac{p_k a_h^{(n)} a_k^{(m)}}{b_h^{(n)} - b_k^{(m)}} + e^{b_h^{(n)}(t-t_{last})} u^{(n,m)}$ | Update $u^{(n,m)}$ |
| 20        $v^{(n,m)} \leftarrow \frac{p_k a_h^{(n)} a_k^{(m)}}{b_h^{(n)} - b_k^{(m)}} + e^{b_k^{(m)}(t-t_{last})} v^{(n,m)}$ | Update $v^{(n,m)}$ |
| 21      end for | |
| 22    end for | |
| 23    $y \leftarrow \Sigma_{n,m}[u^{(n,m)} + v^{(n,m)}]$ | Update output signal y (desired output signal) at $t_k$ |
| 24    $t_{last} \leftarrow t$ | Update last time event processed to t (current event becomes last event) |
| 25  end for | |

Referring to Table 1, an event time vector, event polarity vector and a kernel function h(t) may be used to represent a continuous time input signal x(t). The kernel function h(t) may be further represented using the constant coefficients of the complex weights $a_h$ and exponents $b_h$. A kernel function k(t) may be used to represent the impulse response (or a second input). The kernel function k(t) may be represented using the constant coefficients of the complex weights $a_k$ and exponents $b_k$. When an event occurs, the input signal may be sampled. For each event, state variables may be updated and used to calculate the output directly as the convolution of the input signal and the impulse response. The objective is to compute an output signal, which is the convolution of an input signal and the system impulse response (or a second input signal).

FIG. 1 illustrates an example implementation of the aforementioned processing asynchronous event-driven samples of a continuous time signal using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC may be based on an ARM instruction set. In an aspect of the present disclosure, the instructions loaded into the general-purpose processor 102 may comprise code for calculating a convolutional output directly from the event-driven input samples.

Figure 2:
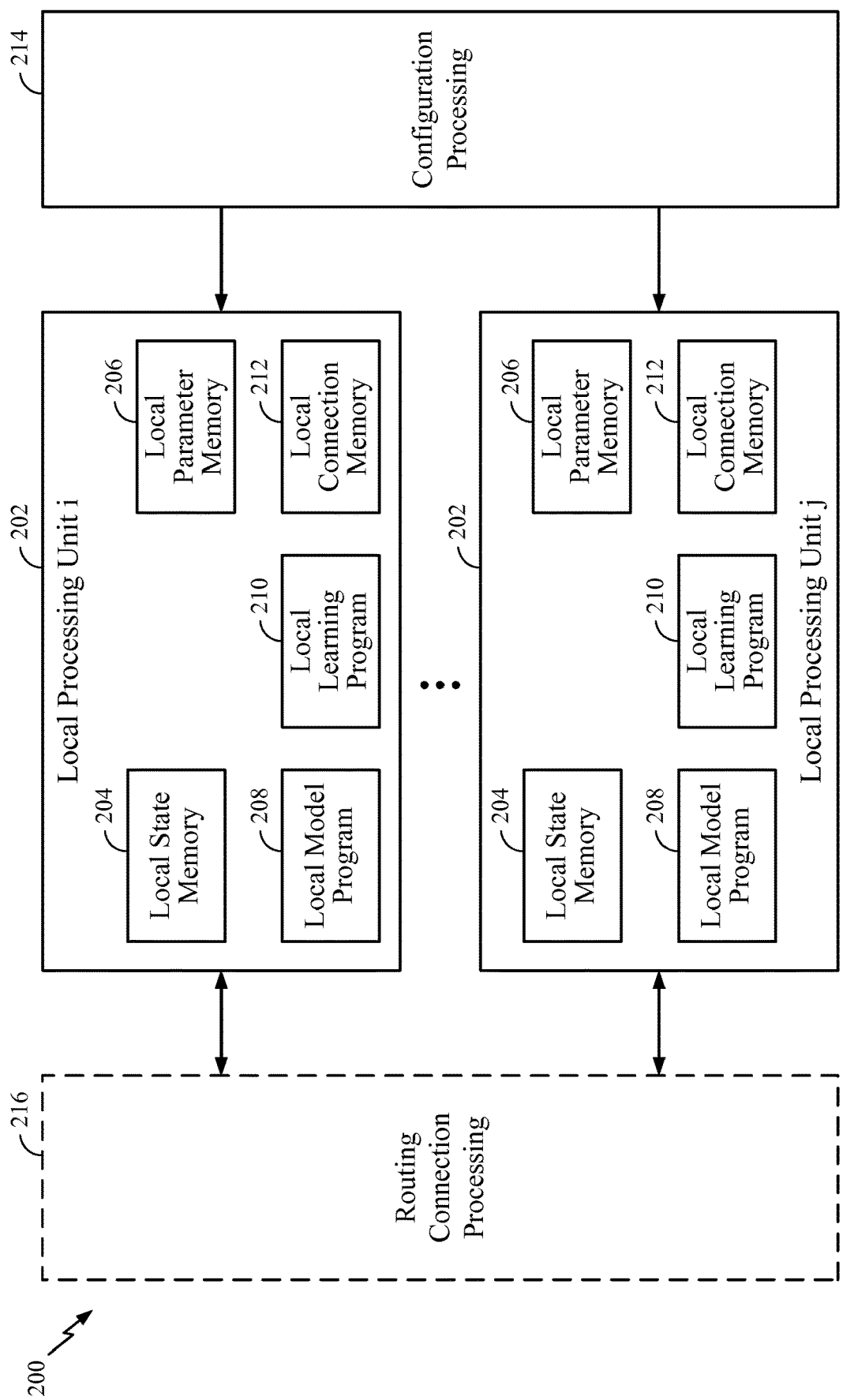
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
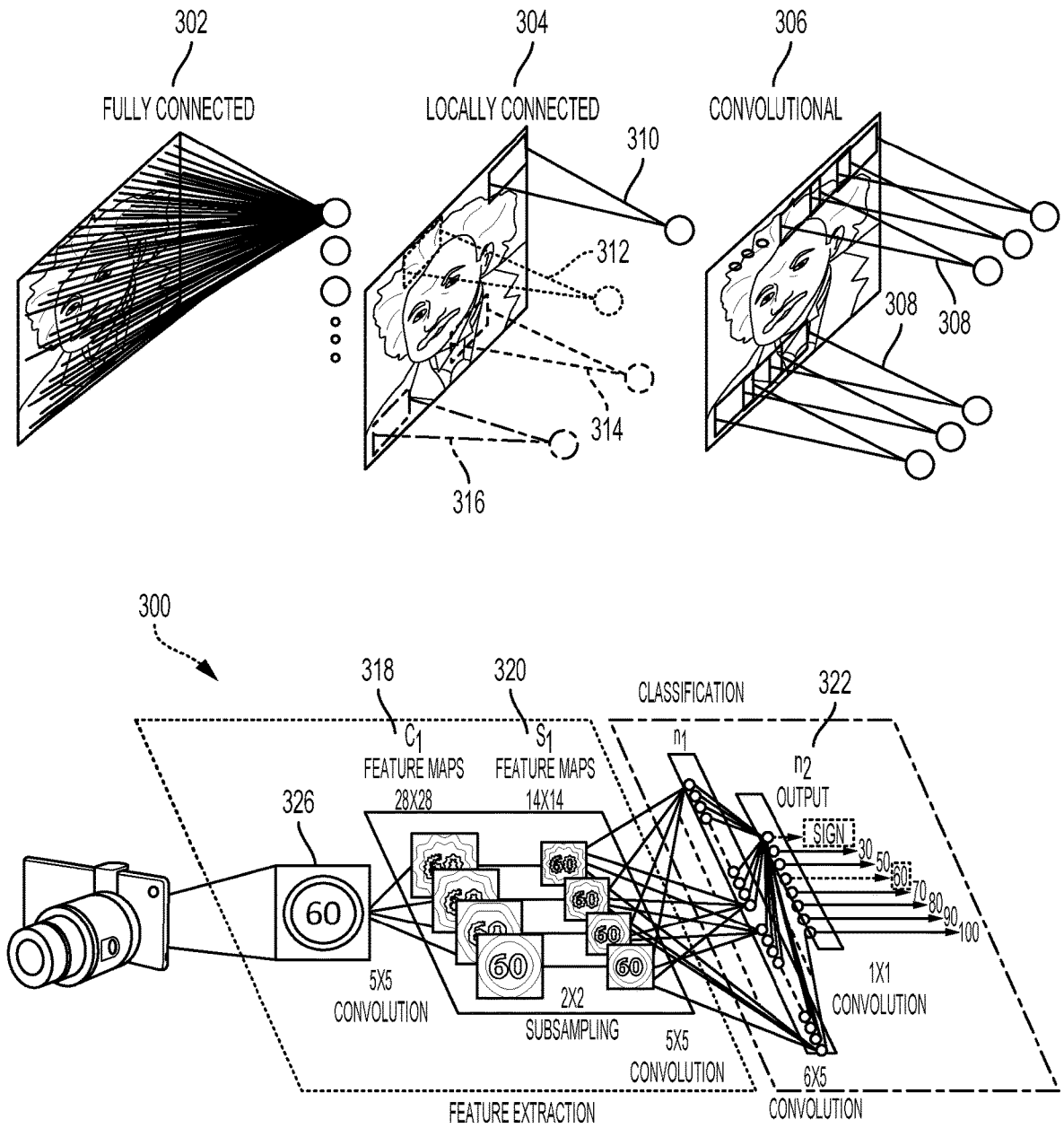
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image 326, such as a cropped image of a speed limit sign, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning process may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
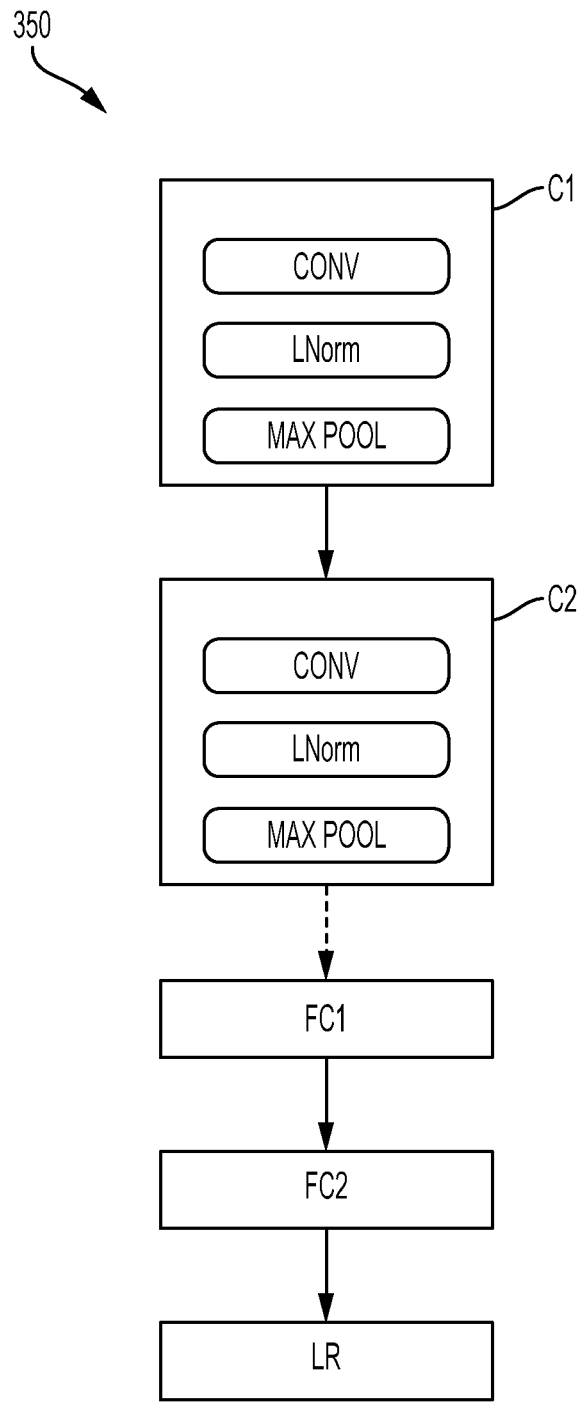
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
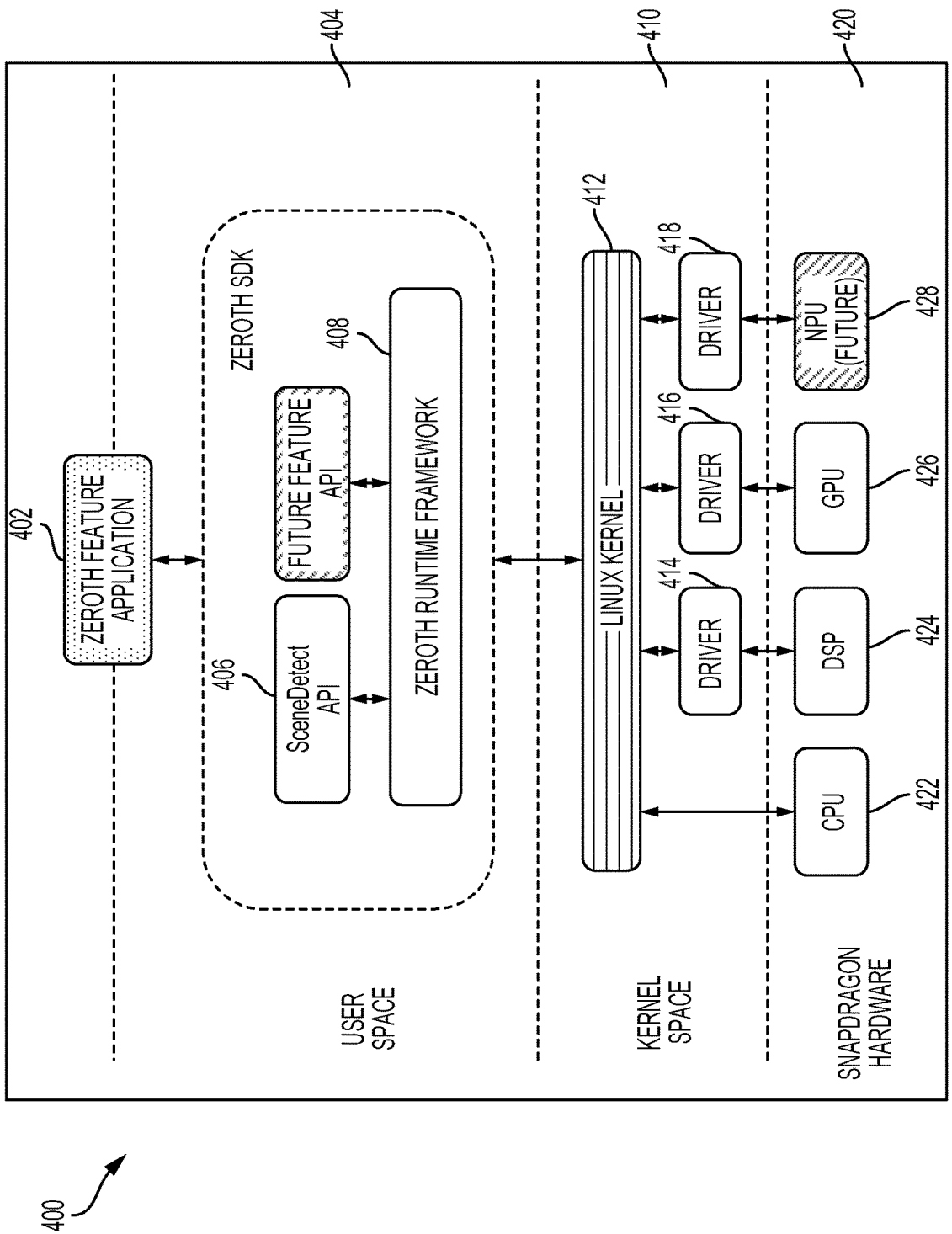
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
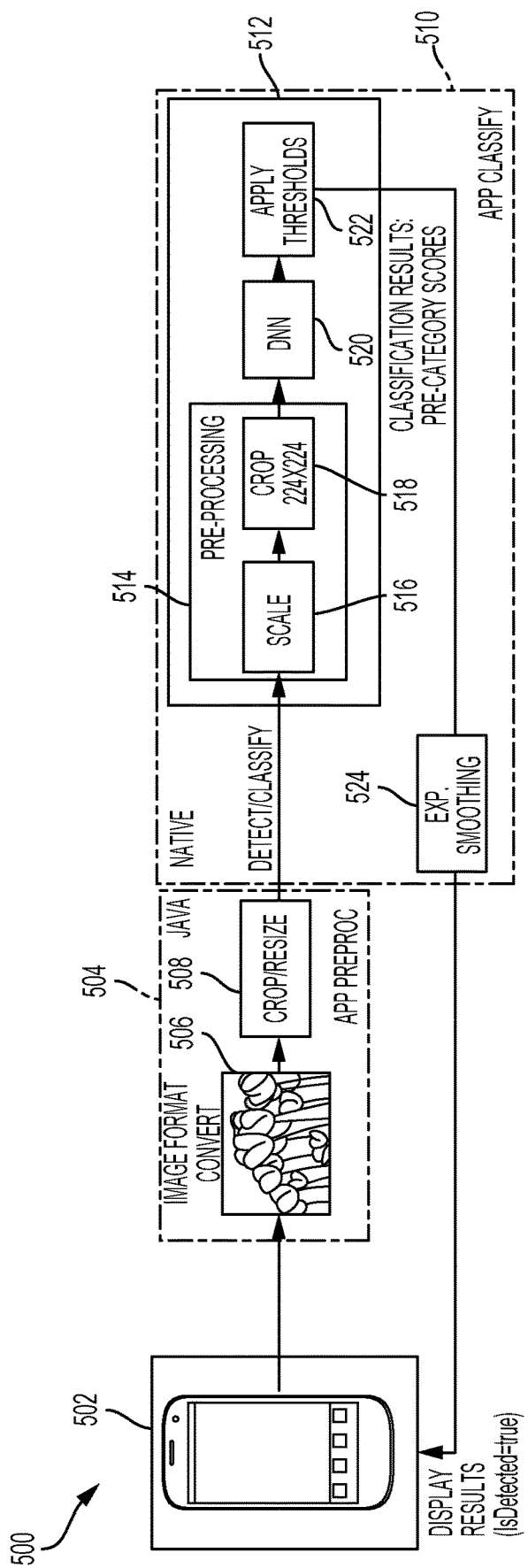
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a neuron model is configured for calculating a convolutional output directly from the event-driven input samples and interpolating output between events. The neuron model includes a calculating means and/or interpolating means. In one aspect, the calculating means and/or interpolating means may be the general-purpose processor 102, program memory associated with the general-purpose processor 102, memory block 118, local processing units 202, the routing connection processing units 216, and/or convolution processing unit 604 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the neural network based upon desired one or more functional features of the neural network, and develop the one or more functional features towards the desired functional features as the determined parameters are further adapted, tuned and updated.

Figure 6A:
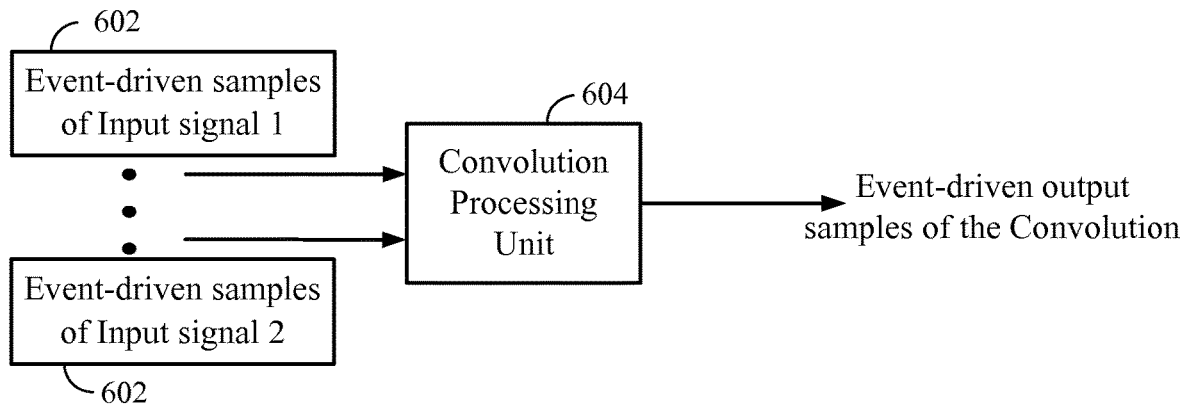
FIGS. 6A and 6B illustrate example implementations of asynchronous, event-driven processing for temporal convolution of sampled signals.
Figure 6B:
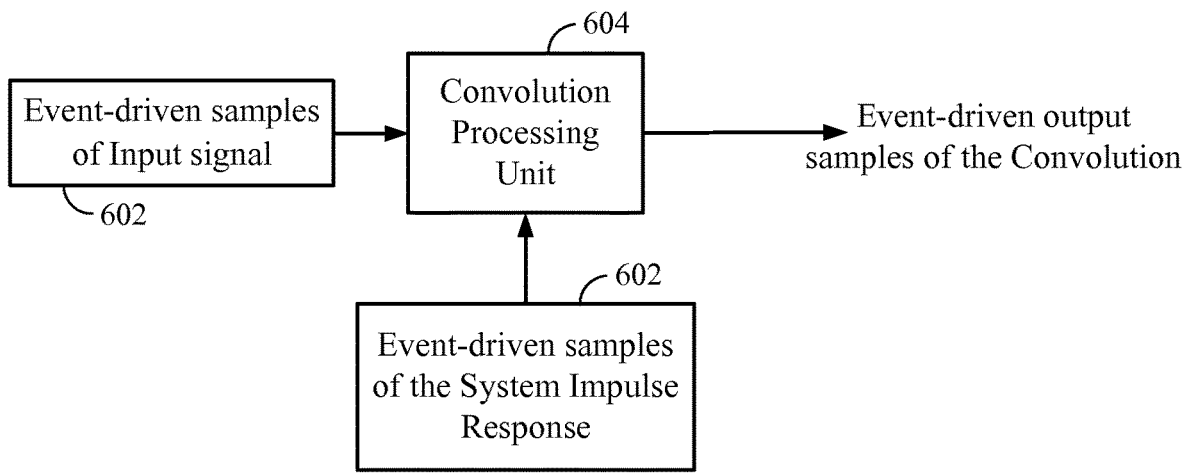

FIGS. 6A and 6B illustrate example implementations of the aforementioned asynchronous, event-driven processing for temporal convolution of sampled signals. As illustrated in FIG. 6A, each memory bank 602 stores event-driven samples of a first input signal and a second input signal associated with a corresponding processing unit (convolution processing unit) 604. In this aspect of the present disclosure, the processing unit 604 may be configured for temporal convolution of sampled signals to provide event-driven output sample of the convolution. As illustrated in FIG. 6B, a memory bank 602 stores event-driven samples of an input signal and another memory bank 602 stores event-driven samples of a system impulse response function associated with a corresponding processing unit (convolution processing unit) 604. The processing unit 604 is configured for temporal convolution of the sampled signals to provide event-driven output samples of the convolution.

Figure 7:
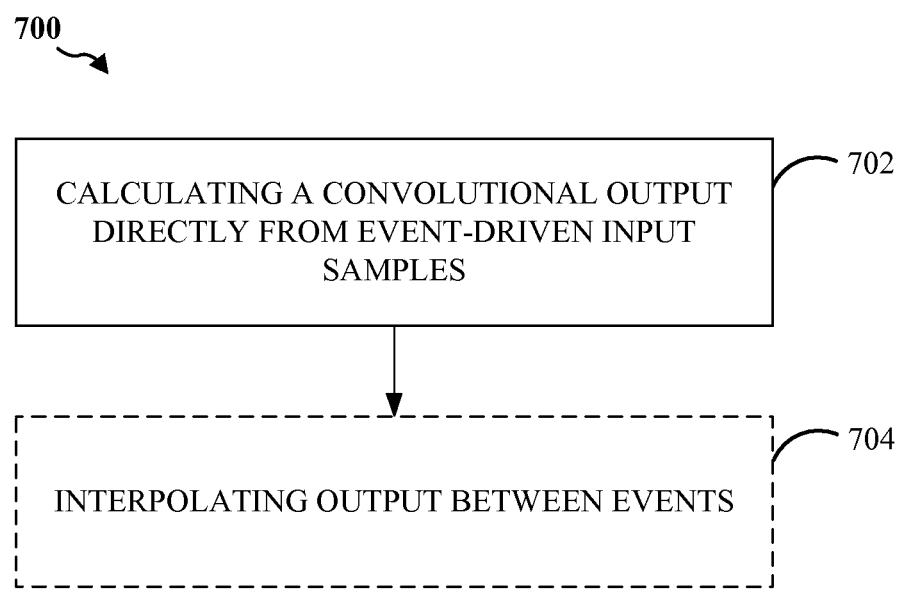
FIG. 7 illustrates a method for processing asynchronous event-driven samples of a continuous time signal in accordance with aspects of the present disclosure.

FIG. 7 illustrates a method 700 for processing asynchronous event-driven samples of a continuous time signal. In block 702, the process calculates a convolutional output directly from the event-driven input samples. In some aspects, the convolutional output may be in an event-based format. The convolutional output may be based on an asynchronous pulse modulated (APM) encoding pulse.

The convolutional output may be calculated by expressing an encoding pulse and a convolutional kernel function as a sum of complex weighted causal complex exponentials. In some aspects, the convolutional output may be calculated by approximating an encoding pulse and a convolutional kernel function as a sum of complex weighted causal complex exponentials.

In some aspects, the event-driven input samples may include event-driven samples of an input signal and event-driven samples of a system impulse response function. As such, the convolutional output may be calculated by generating the convolution output in an event-driven manner in response to an input signal event.

In block 704, the process interpolates output between events. In some aspects, the process further calculates a second convolutional output directly from the convolutional output, which is in an event-based format.

Figure 8:
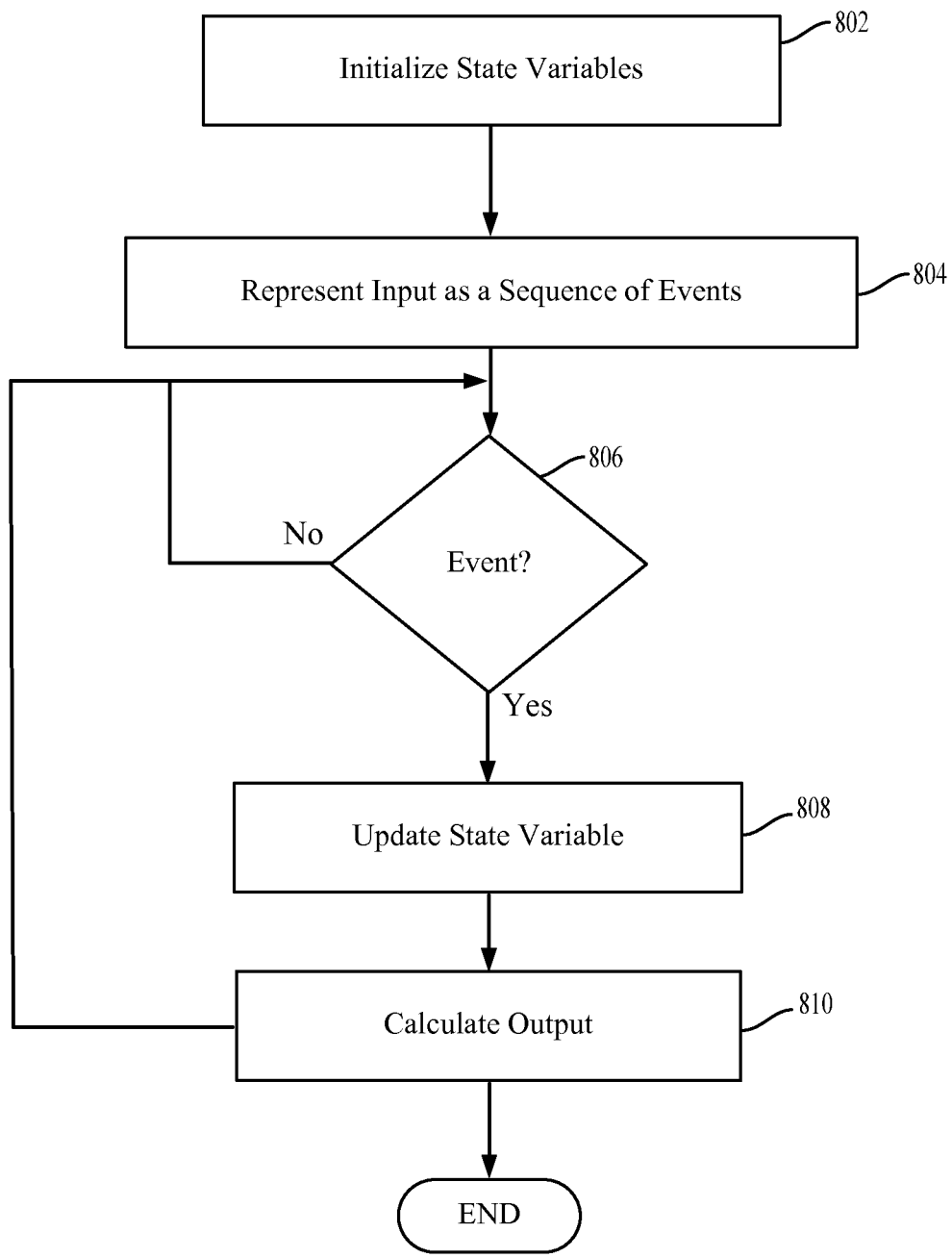
FIG. 8 is a block diagram illustrating a method for event-driven temporal convolution for sampled signals according to aspects of the present disclosure.

FIG. 8 is a block diagram illustrating a method for event-driven temporal convolution for sampled signals according to aspects of the present disclosure. In block 802, the process initializes state variables (e.g., $u^{(n,m)}$, $v^{(n,m)}$). In block 804, the process represents a continuous time input signal as a sequence of events. For example, an event-based sampling process (e.g., APM sampling) may be applied to generate a train of pulses. In some aspects, the train of pulses may be positive pulses, negative pulses or both (bipolar).

In block 806, the process determines whether an event has occurred. If an event has occurred, the process updates the state variables (e.g., $u^{(n,m)}$, $v^{(n,m)}$) in block 808. In block 810, the process calculates the output signal at time $t_k$ using the updated state variables. The output signal may comprise an approximation of the continuous time output signal y(t). On the other hand, if an event has not occurred, the process may return to block 806 to await the occurrence of an event (e.g., remain in an idle mode).

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A processor-implemented method of processing asynchronous event-driven input samples of a continuous time analog signal by an artificial neural network, the method comprising:
   receiving, by the artificial neural network, a continuous time input signal;
   initializing a first state variable and a second state variable;
   sampling the continuous time input signal at times corresponding to occurrences of one or more events in the continuous time input signal;
   updating the first state variable and the second state variable based on a polarity of the sampled input signal and coefficients of an impulse response to the sampled input signal;
   generating, by the artificial neural network, an event train based on the sampled continuous time input signal, the event train comprising pulses corresponding to the one or more events;
   generating, by the artificial neural network, a first approximation of a continuous time output at a time corresponding to occurrence of at least a first event of the one or more events calculated based on a sum of the updated first state variable and the updated second state variable, expressed as a_sum of complex weighted causal complex exponentials, the first approximation of the continuous time output is in an event-based format; and
   generating, by the artificial neural network, a classification related to the time input signal based on the first approximation of the continuous time output.

2. The processor-implemented method of claim 1, further comprising convolving to generate a second approximation of the continuous time input signal at a second time corresponding to occurrence of a second event based on the first approximation of the first continuous time output in the event-based format without converting the first approximation of the first continuous time output to a continuous time signal format.

3. The processor-implemented method of claim 1, further comprising interpolating a digital approximation between the one or more events.

4. The processor-implemented method of claim 1, in which the continuous time input signal is sampled according to an asynchronous pulse modulated (APM) sampling process.

5. The processor-implemented method of claim 1, in which the continuous time input signal is sampled according to a level-crossing sampling process.

6. An apparatus including an artificial neural network for processing asynchronous event-driven input samples of a continuous time analog signal, comprising:

a memory; and at least one processor coupled to the memory, the at least one processor configured:
- to receive, by the artificial neural network, a continuous time input signal;
- to initialize a first state variable and a second state variable;
- to sample the continuous time input signal at times corresponding to occurrences of one or more events in the continuous time input signal;
- to update the first state variable and the second state variable based on a polarity of the sampled input signal and coefficients of an impulse response to the sampled input signal;
- to generate, by the artificial neural network, an event train based on the sampled continuous time input signal, the event train comprising pulses corresponding to the one or more events;
- to generate, by the artificial neural network, a first approximation of a continuous time output at a time corresponding to occurrence of at least a first event of the one or more events calculated based on a sum of the updated first state variable and the updated second state variable, expressed as a sum of complex weighted causal complex exponentials, the first approximation of the continuous time output is in an event-based format; and
- to generate, by the artificial neural network, a classification related to the continuous time input signal based on the approximation of the continuous time output.

7. The apparatus of claim 6, in which the at least one processor is further configured to generate a second approximation of the continuous time input signal at a second time corresponding to occurrence of a second event based on the first approximation of the first continuous time output in the event-based format without converting the first approximation of the first continuous time output to a continuous time signal format.

8. The apparatus of claim 6, in which the continuous time input signal is sampled according to an asynchronous pulse modulated (APM) sampling process.

9. The apparatus of claim 6, in which the at least one processor is further configured to sample the continuous time input signal according to a level-crossing sampling process.

10. The apparatus of claim 6, in which the at least one processor is further configured to interpolate a digital approximation between the one or more events.

11. An apparatus for processing asynchronous event-driven input samples of a continuous time analog signal by an artificial neural network, comprising:
- means for receiving, by the artificial neural network, a continuous time input signal;
- means for initializing a first state variable and a second state variable;
- means for sampling the continuous time input signal at times corresponding to occurrences of one or more events in the continuous time input signal;
- means for updating the first state variable and the second state variable based on a polarity of the sampled input signal and coefficients of an impulse response to the sampled input signal;
- means for generating, by the artificial neural network, an event train based on the sampled continuous time input signal, the event train comprising pulses corresponding to the one or more events;
- means for generating, by the artificial neural network, a first approximation of a continuous time output at a time corresponding to occurrence of at least a first event of the one or more events calculated based on a sum of the updated first state variable and the updated second state variable, expressed as a sum of complex weighted causal complex exponentials, the first approximation of the continuous time output is in an event-based format; and
- means for generating, by the artificial neural network, a classification related to the continuous time input signal based on the first approximation of the continuous time output.

12. The apparatus of claim 11, further comprising means for convolving to generate a second approximation of the continuous time input signal at a second time corresponding to occurrence of a second event based on the first approximation of the first continuous time output in the event-based format without converting the first approximation of the first continuous time output to a continuous time signal format.

13. The apparatus of claim 11, in which the continuous time input signal is sampled according to an asynchronous pulse modulated (APM) sampling process.

14. The apparatus of claim 11, further comprising means for sampling the continuous time input signal according to a level-crossing sampling process.

15. The apparatus of claim 11, further comprising means for directly generating a digital approximation of the continuous time input signal in the event-based format.

16. A non-transitory computer readable medium having encoded thereon program code which when executed by a processor causes the processor to process asynchronous event-driven input samples of a continuous time analog signal by an artificial neural network, the program code comprising:
- program code to receive, by the artificial neural network, a continuous time input signal;
- program code to initialize a first state variable and a second state variable;
- program code to sample the continuous time input signal at times corresponding to occurrences of one or more events in the continuous time input signal;
- program code to update the first state variable and the second state variable based on a polarity of the sampled input signal and coefficients of an impulse response to the sampled input signal;
- program code to generate, by the artificial neural network, an event train based on the sampled continuous time input signal, the event train comprising pulses corresponding to the one or more events;
- program code to generate, by the artificial neural network, a first approximation of a continuous time output at a time corresponding to occurrence of at least a first event of the one or more events calculated based on a sum of the updated first state variable and the updated second state variable, expressed as a sum of complex weighted causal complex exponentials, the first approximation of the continuous time output is in an event-based format; and
- program code to generate, by the artificial neural network, a classification related to the continuous time input signal based on the first approximation of the continuous time output.

17. The non-transitory computer readable medium of claim 16, further comprising program code to convolve to generate a second approximation of the continuous time input signal at a second time corresponding to occurrence of a second event based on the first approximation of the first continuous time output in the event-based format without converting the first approximation of the first continuous time output to a continuous time signal format.

18. The non-transitory computer readable medium of claim 16, further comprising program code to interpolate the digital approximation between the one or more events.

19. The non-transitory computer readable medium of claim 16, further comprising program code to sample the continuous time input signal according to an asynchronous pulse modulated (APM) sampling process.

20. The non-transitory computer readable medium of claim 16, further comprising program code to sample the continuous time input signal according to a level-crossing sampling process.

* * * * *